(12) United States Patent
Lee et al.

(10) Patent No.: US 6,683,563 B2
(45) Date of Patent: Jan. 27, 2004

(54) SYSTEM FOR DETERMINING PRECISE ORBIT OF SATELLITE AND METHOD THEREOF

(75) Inventors: Jeong-Sook Lee, Daejeon (KR); Byoung-Sun Lee, Daejeon (KR); Jae-Hoon Kim, Daejeon (KR); Seong-Pal Lee, Daejeon (KR); Jae-Cheol Yoon, Seoul (KR); Kyu-Hong Choi, Seoul (KR); Kyoung-Min Roh, Seoul (KR); Eun-Seo Park, Seoul (KR); Bo-Yeon Moon, Seoul (KR)

(73) Assignee: Electronics and Telecommunications Research Institute, Daejeon-city (KR)

( * ) Notice: Subject to any disclaimer, the term of this patent is extended or adjusted under 35 U.S.C. 154(b) by 3 days.

(21) Appl. No.: 10/194,242

(22) Filed: Jul. 15, 2002

(65) Prior Publication Data
US 2003/0098810 A1 May 29, 2003

(30) Foreign Application Priority Data
Nov. 23, 2001 (KR) .......................... 2001-73228

(51) Int. Cl.$^7$ .............................. G01S 5/02; H04B 7/85
(52) U.S. Cl. ............................ 342/357.02; 342/357.06; 342/357.16; 342/358; 701/213; 701/226
(58) Field of Search ..................... 342/357.02, 357.06, 342/357.16, 358; 701/213, 226

(56) References Cited
U.S. PATENT DOCUMENTS 5,323,332 A * 6/1994 Smith et al. ................. 342/358
5,717,404 A 2/1998 Malla
6,538,602 B2 * 3/2003 Natsume et al. ............ 342/359

OTHER PUBLICATIONS

Lough, Haines, Muellerschoen, and Vigue–Rodi; *Precise Orbit Determination for Low Earth Orbiting Satellites using GPS Date*: Recent Advences; ION 98 Conference Proceeding; pp. 123–131.

Gold, Bertiger, Wu, Yunck, Muellerschoen, and Born; *GPS Orbit Determination for the Extreme Ultraviolet Explorer*; Navigation: Journal of The Instithute of Navigation; vol. 41, No. 3, Fall 1994; pp. 337–351.

* cited by examiner

Primary Examiner—Theodore M. Blum
(74) Attorney, Agent, or Firm—Jacobson Holman PLLC

(57) ABSTRACT

In a system for determining a precise orbit of a satellite, a satellite control system includes a tracking, telemetry and command module for receiving telemetry data from the satellite, tracking the satellite, and performing link to the satellite; a satellite operations sub module for extracting L1 carrier phase data by processing the telemetry data, monitoring the satellite, generating telecommand data, and controlling the satellite; and a mission analysis and planning subsystem for determining the precise orbit of the satellite using the L1 carrier phase data collected by a satellite, L1/L2 carrier phase data of the reference ground stations of the GPS satellites collected by an IGS, and a path error caused by the ionosphere of data, and analyzing and planning a mission of the satellite.

15 Claims, 4 Drawing Sheets

SYSTEM FOR DETERMINING PRECISE ORBIT OF SATELLITE AND METHOD THEREOF

BACKGROUND OF THE INVENTION (a) Field of the Invention

The present invention relates to a system for determining a precise orbit of a satellite and a method thereof. More specifically, the present invention relates to a system for determining a precise orbit of a satellite and a method thereof, in which the system and method are applied to a mission requiring position information that is accurate to within 1 m, such precise position information being obtained by using only L1 carrier phase data and applying a proportional coefficient of the total number of electrons of the ionosphere to an estimation parameter in order to minimize the errors in an ionospheric model.

(b) Description of the Related Art

A global positioning system (GPS) provides three-dimensional information such as the position, the speed, and the direction of a moving object. The GPS is now used for various applications such as in geodetic surveys, general surveying, scientific surveys, and visual synchronization, as well as in moving object navigation systems for the sea, the earth, and the air.

Taken as a whole, the GPS consists of three units: a space unit, a control unit, and a user unit. The transmitter of the GPS satellite generates a C/A (coarse/acquisition) code and a P (precision) code, that are pseudo noise codes, to thus modulate a carrier. The signal modulated in this manner is propagated to a user through an amplifier and an antenna.

The frequency of a carrier for a standard lateral position is 1575.42 MHz (L1 band) and the frequency of a carrier for a lateral position is 1227.6 MHz (L2 band). The L1 band carrier and the L2 band carrier are phase-modulated by the C/A code and the P code. The L1 band frequency uses the P code and the C/A code. The L2 band frequency uses only the P code.

An algorithm for determining a precise orbit of a satellite using the GPS data includes precise orbit dynamics models, measurement models, and an estimation algorithm.

Therefore, according to the algorithm for determining the precise orbit of the satellite using the GPS data, after predicting the orbit for each measurement time by applying precise orbit dynamics models from an initial orbit element, calculated measurement data are obtained by applying measurement models.

An orbit of a satellite is determined through an estimation algorithm using the differences between actual measurement data received from an on-board receiver of a satellite and GPS receivers of ground stations and calculated measurement data obtained by applying the measurement models.

When the on-board GPS receiver uses only received L1 single frequency GPS carrier phase data in a process of determining the precise orbit of the satellite, a path error of a signal through the ionosphere is not completely removed, and accordingly, significant errors exist in the measurement data calculated by the measurement models.

Data errors caused by the path error of a signal must be reduced in order to determine the precise orbit of the satellite.

In the conventional method for determining the precise orbit of a satellite using GPS data, the precise orbit is determined using two different techniques when the on-board GPS receiver generates only the GPS data of the L1 single frequency.

According to the first technique of determining the precise orbit of the satellite using the GPS data, an ionospheric error is removed by combining pseudo range data of a C/A code or a P code with the L1 single frequency GPS carrier phase data.

The GPS satellite broadcasts signals with the C/A code or the P code loaded on the L1 band frequency. The GPS receiver generates the same code, compares the generated code with the code of the received satellite, and measures the time it takes for a signal of the satellite to leave the satellite and to reach the receiver.

Therefore, a distance between the satellite and the receiver is measured by multiplying the speed of light (the speed of the satellite signal) to the time elapsed. The C/A code is formed of a pseudo random noise code that is almost actual noise. Because the obtained distance includes an error, the distance is called a pseudo range.

At this time, because the noise of a code pseudo range is larger than the noise of carrier phase data by 1000 times in the case of the C/A code pseudo distance and by 100 times in the case of the P code pseudo distance, new errors caused by pseudo range noise are added instead of removing the ionospheric error. A degree of precision in the orbit determination deteriorates due to such errors.

In the second technique of determining the precise orbit of the satellite using the GPS data, the total number of electrons of the ionosphere is estimated using the IRI-95 ionospheric model. The path error caused by the ionosphere is calculated using the estimated total number of electrons of the ionosphere.

However, according to the above methods, because only about 60% of the error of an actually existing ionosphere is corrected using only the ionospheric model, the degree of precision in the orbit determination deteriorates.

SUMMARY OF THE INVENTION

It is an object of the present invention to provide a system for determining a precise orbit of a satellite and a method thereof, in which the system and method are capable of improving the degree of precision in determining a satellite orbit by determining a precise orbit of a low orbit satellite using L1 carrier satellite data received from a satellite and by removing a path error caused by the ionosphere by applying a proportional coefficient of the total number of electrons of the ionosphere to an estimation parameter.

In order to achieve the above object, there is provided a system for determining a precise orbit of a satellite including a satellite for receiving GPS data from GPS satellites, an international GPS service for geodynamics (IGS) for collecting and processing L1/L2 carrier phase data of reference ground stations of the GPS satellites distributed all over the world, a satellite control system for monitoring and controlling a state of a satellite by receiving telemetry data and transmitting telecommand data through an antenna and for achieving the L1/L2 carrier phase data of the IGS, and an image processing system for processing image data collected by the satellite.

The satellite control system comprises a tracking, telemetry and command (TTC) module for receiving the telemetry data from the satellite, tracking the satellite, and performing a link to the satellite; a satellite operations sub module for extracting the L1 carrier phase data by processing and analyzing the telemetry data received by the TTC module, monitoring the state of the satellite, generating telecommand data to be transmitted to the satellite, and controlling and operating the satellite; and a mission analysis and planning subsystem (MAPS) for determining the precise orbit of the satellite using the L1 carrier phase data extracted by the satellite operations sub module, the L1/L2 carrier phase data of the reference ground stations of the GPS satellites collected by the IGS, and a path error caused by the ionosphere of data, and for analyzing and planning a mission of the satellite.

The MAPS comprises a first data generator for generating double differenced actual measurement data with respect to the L1 carrier phase data extracted by the satellite operations sub module and the L1/L2 carrier phase data of the reference ground stations of the GPS satellites collected by the IGS by pre-processing processor; a second data generator for generating predicted precise orbit data of a satellite by applying precise orbit perturbation models from a priori orbit and attitude elements at the measurement time with respect to the L1 carrier phase data extracted by the satellite operations sub module and the L1/L2 carrier phase data of the reference ground stations of the GPS satellites collected by the IGS; a third data generator for calculating measurement errors through GPS measurement models and generating calculated measurement data with respect to the predicted precise orbit data of the satellite, which is generated by the second data generator; and a fourth data generator for generating a proportional coefficient of the total number of electrons through an operation between the calculated measurement data of the third data generator and actual measurement data of the first data generator, and generating the estimated orbit element and the estimated parameters comprising the proportional coefficient of the total number of electrons of the ionosphere through estimating the parameters and the precise orbit of the satellite.

The precise orbit perturbation models of the second data generator calculate the precise orbit perturbation forces caused by gravitational forces and the perturbation forces caused by non-gravitational forces from a priori orbit and attitude elements at the measurement time, and generate predicted precise orbit data of the satellite with respect to given measurement time according to the equation of motion for a satellite.

The GPS measurement models of the third data generator calculate the measurement models such as ionospheric path delay effect, tropospheric path delay effect, relativistic effect, tide effect of the earth and the ocean, and phase center offset and variation of the GPS receiver antenna.

The third data generator calculates the total number of electrons of the ionosphere using a priori orbit and attitude elements at the measurement time, and the proportional coefficient of the total number of electrons, calculates a delay value of the L1 carrier phase data due to the ionosphere from the total number of electrons of the ionosphere, calculates the proportional coefficient partial derivative of the total number of electrons of the ionosphere using the delay value of the L1 carrier phase data, and calculates a measurement error.

The fourth data generator generates the measurement residuals and the partial derivatives of parameters using the differences between the calculated measurement data of the third data generator and the actual measurement data of the first data generator, and estimates the parameters and the precise orbit of the satellite.

The fourth data generator estimates the state of the satellite and the parameters, which affect the orbit of the satellite, by a weighted least squares batch filter using the measurement residuals and the partial derivatives of the parameters.

There is provided a method for determining a precise orbit of a satellite, the method being applied to a system including a satellite for receiving global positioning system (GPS) data from the GPS satellites, an international GPS service for geodynamics (IGS) for collecting and processing L1/L2 carrier phase data of reference ground stations of the GPS satellites distributed all over the world, a satellite control system for monitoring and controlling a state of a satellite by receiving telemetry data and transmitting telecommand data through an antenna and for achieving the L1/L2 carrier phase data of the IGS, and an image processing system for processing image data collected by the satellite and generating a precise image photograph, the method comprising (a) receiving telemetry data from the satellite and extracting the L1 carrier phase data from the telemetry data and (b) determining the precise orbit of the satellite using the L1 carrier phase data extracted in the step (a), the L1/L2 carrier phase data collected by the IGS, and a path error caused by the ionosphere, and analyzing and planning a mission of a satellite.

The step (b) comprises the step of processing image data collected by the image processing system from the satellite using the precise orbit data of the satellite and generating a precise image.

The step (b) comprises (b1) generating the double differenced actual measurement data with respect to the L1 carrier phase data and the L1/L2 carrier phase data collected by the IGS by pre-processing processor, (b2) generating the predicted precise orbit data of the satellite with respect to the L1 carrier phase data and the L1/L2 carrier phase data collected by the IGS by applying the precise orbit dynamics models from a priori orbit and attitude elements at the measurement time, (b3) calculating a measurement error with respect to the predicted precise orbit data of the satellite, which is generated in the step (b2), through GPS measurement models and generating the calculated measurement data, and (b4) estimating the parameters and the precise orbit of the satellite by performing an operation on the calculated measurement data generated in the step (b3) and the actual measurement data generated in the step (b1), generating the proportional coefficient of the total number of electrons of the ionosphere, and generating the orbit element and the estimated parameters comprising the proportional coefficient of the total number of electrons of the ionosphere.

The step (b4) comprises (i) calculating the measurement residuals and the partial derivates of the parameters to be determined using differences between the calculated measurement data and the actual measurement data, (ii) estimating the parameters and the satellite orbit using the measurement residuals and the partial derivatives of the parameters in the step (i) and determining whether differences between the predicted satellite orbit and the actual data converge within a limited value given by the system, and (iii) storing and outputting the precise orbit elements of the satellite and the estimated parameters when the differences between the satellite orbit estimated in the step (ii) and the actual measurement data converge within the limited value given by the system.

When the differences between the estimated satellite orbit in the step (ii) and the actual measurement data do not converge within the limited value given by the system, the step (b4) further comprises (iv) performing the steps (b2) through (b4) using the estimated satellite orbit element as a priori orbit element at the measurement time and determining whether the differences between the repredicted satellite orbit and the actual measurement data converge within the limited value given by the system.

The GPS measurement models in the step (b3) calculate measurement models such as ionospheric path delay effect, tropospheric path delay effect, relativistic effect, tide effect of the earth and the ocean, and phase center offset and variation of the GPS receiver antenna through modeling.

The step (b3) comprises (i) calculating the total number of electrons of the ionosphere using a priori orbit and attitude elements at the measurement time, and the proportional coefficient of the total number of electrons and applying the GPS measurement models, (ii) calculating the delay value of the L1 carrier phase data caused by the ionosphere from the total number of electrons of the ionosphere, which is calculated in the step (i), and (iii) calculating the proportional coefficient partial derivative of the total number of electrons of the ionosphere and the measurement error using the delay value of the L1 carrier phase data, which is calculated in the step (ii) and calculating the calculated measurement data by applying other GPS measurement models other than ionospheric path delay effect.

In the step (b4), the parameters and the orbit element of the satellite are estimated using the proportional coefficient partial derivative data of the total number of electrons of the ionosphere, which is calculated in the step (iii), and the orbit element at epoch and the proportional coefficient of the total number of electrons of the ionosphere are generated and are applied to determining the precise orbit of the satellite.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
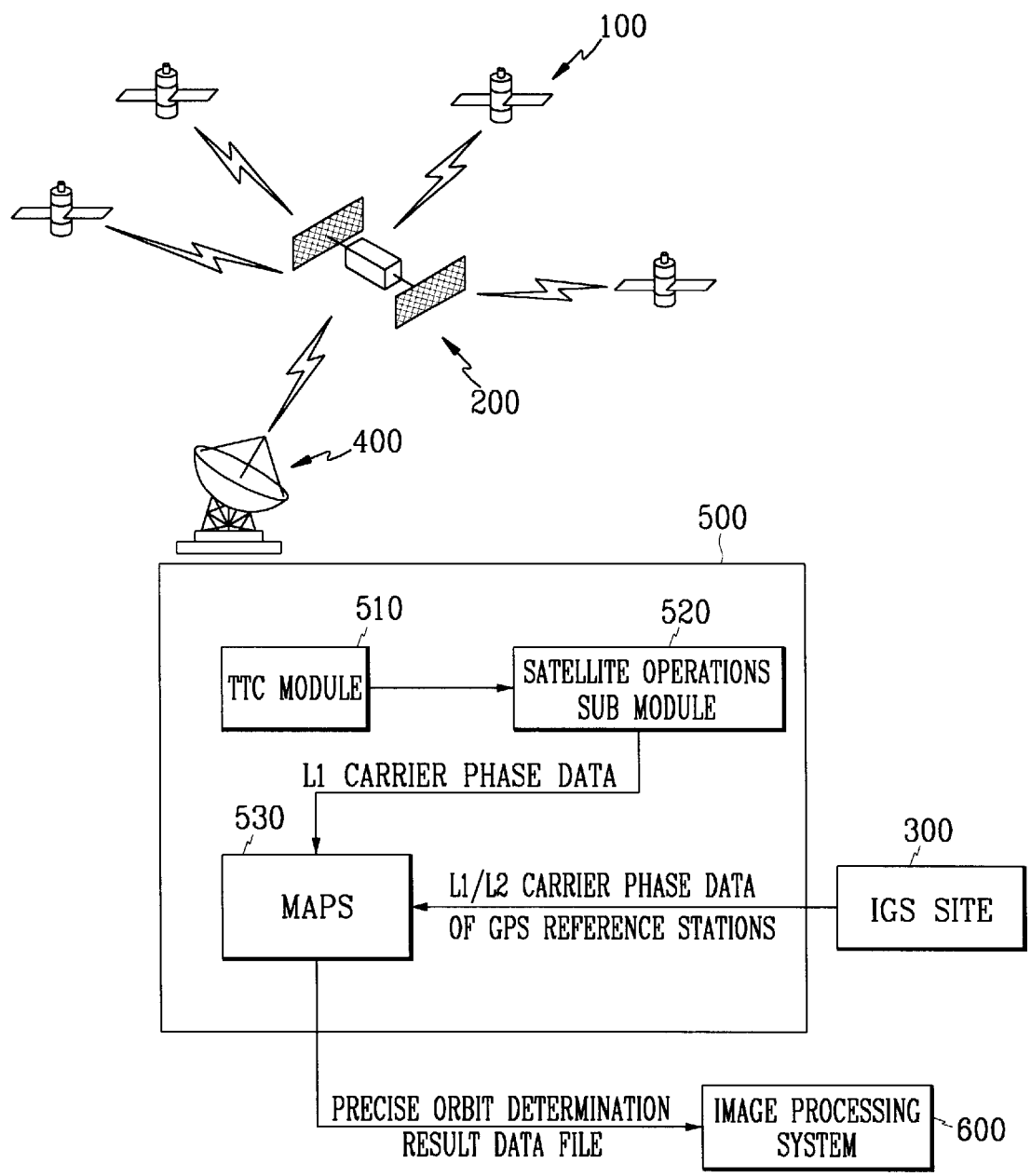
FIG. 1 is a block diagram showing a structure of a system for determining a precise orbit of a satellite according to an embodiment of the present invention.

FIG. 1 is a block diagram showing a structure of a system for determining a precise orbit of a satellite according to the present invention.

As shown in FIG. 1, a low orbit satellite 200 for receiving global positioning data from a global positioning system (GPS) satellite 100, an international GPS service for geodynamics (IGS) site 300 for collecting and processing L1/L2 carrier phase data of reference ground stations of the GPS satellites 100 distributed all over the world, a satellite control system 500 for receiving telemetry data and transmitting telecommand data of the low orbit satellite 200 through an antenna 400, and monitoring and controlling the state of the satellite, and for achieving the L1/L2 carrier satellite data of the IGS site 300, and an image processing system 600 for processing image data collected by the satellite and generating a precise image photograph are connected via communication link.

In particular, the satellite control system 500 includes a tracking, telemetry and command (TTC) module 510 for receiving the telemetry data from the low orbit satellite 200, tracking the low orbit satellite 200, and performing a link to the low orbit satellite 200; a satellite operations sub module 520 for processing and analyzing the telemetry data received by the TTC module 510, extracting the L1 carrier phase data received from the GPS receiver mounted on-board the low orbit satellite 200, monitoring the state of the low orbit satellite 200, generating telecommand data to be transmitted to the low orbit satellite 200, and controlling and operating the satellite; and a mission analysis and planning subsystem (MAPS) 530 for determining the precise orbit of the satellite as removing a path error caused by the ionosphere by using the L1 carrier phase data extracted by the satellite operations sub module 520 and the L1/L2 carrier phase data of the reference ground stations of the GPS satellites 100 collected by the IGS site 300 and applying the proportional coefficient of the total number of electrons of the ionosphere, and analyzing and planning a satellite mission.

Figure 2:
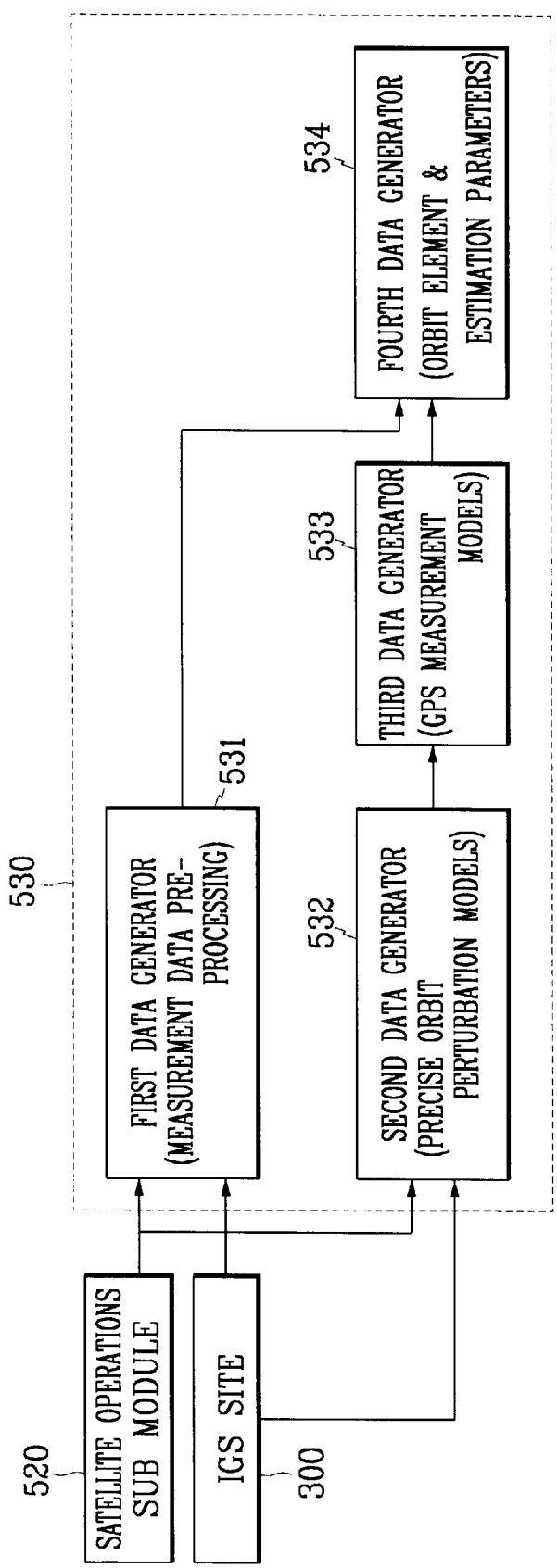
FIG. 2 is a block diagram showing a structure of a mission analysis and planning subsystem (MAPS) for a satellite, which is a partial element of FIG. 1.

FIG. 2 is a block diagram showing a structure of a MAPS module for a satellite, which is a partial element of FIG. 1.

As shown in FIG. 2, the MAPS 530 includes a first data generator 531 for performing measurement data pre-processing on the L1 carrier phase data extracted from the telemetry data by the satellite operations sub module 520 and the L1/L2 carrier phase data of the reference ground stations of the GPS satellites 100 collected by the IGS site 300 in order to generate the double differenced actual measurement data, a second data generator 532 for generating predicted precise orbit data of a satellite from a priori orbit and attitude elements at the measurement time with respect to the L1 carrier phase data extracted by the satellite operations sub module 520 and the L1/L2 carrier phase data of the reference ground stations of the GPS satellites 100 collected by the IGS site 300 by applying precise orbit perturbation models, a third data generator 533 for calculating a measurement error with respect to the predicted precise orbit data of the satellite, which is generated by the second data generator, through GPS measurement models and generating the calculated measurement data, and a fourth data generator 534 for generating the proportional coefficient of the total number of electrons of the ionosphere by estimating parameters and the precise orbit of the satellite through an operation between the calculated measurement data of the third data generator 533 and the actual measurement data of the first data generator 531, and generating the orbit element and the estimated parameters including the proportional coefficient of the total number of electrons of the ionosphere.

The precise orbit perturbation models of the second data generator 532 calculate a priori orbit perturbation forces and the perturbation forces caused by non-gravitational forces at the measurement time, and generate predicted precise orbit data of the satellite with respect to the given measurement time according to the equation of motion for a satellite.

The GPS measurement models of the third data generator 533 perform modeling on measurement models such as ionospheric path delay effect, tropospheric path delay effect, relativistic effect, the earth and ocean tide effect, phase center offset and variation of the GPS receiver antenna, and geometric distance, and generate the calculated measurement data.

The third data generator 533 calculates the total number of electrons of the ionosphere using a priori orbit and attitude elements used by the second data generator 532 and the proportional coefficient of the total number of electrons at the measurement time. The third data generator 533 calculates the delay value of the L1 carrier caused by the ionosphere the total number of electrons of the ionosphere.

The third data generator 533 calculates the proportional coefficient partial derivative of the total number of electrons of the ionosphere and the measurement error using the delay value of the L1 carrier due to the ionosphere.

The fourth data generator 534 generates the orbit element and the proportional coefficient of the total number of electrons of the ionosphere at epoch using the proportional coefficient partial derivative of the total number of electrons of the ionosphere and the calculated measurement data generated by the third data generator 533 through an estimation algorithm among precision orbit dynamics models, measurement models, and an estimation algorithm.

The fourth data generator 534 includes the proportional coefficient of the total number of electrons of the ionosphere in the estimated parameters.

The fourth data generator 534 calculates measurement residuals and the partial derivatives of the parameters to be determined using the differences between the actual measurement data generated by the first data generator 531 and the calculated measurement data generated by the third data generator 533, and generates the estimation parameters and the orbit element through the estimation algorithm. The fourth data generator 534 estimates the satellite state data and the parameters, which affect the orbit of the satellite by a weighted least squares batch filter using the partial derivatives of the parameters and the measurement residuals, which are calculated above.

The operation of the system for determining the precise orbit of the satellite structured as in the above will now be described with reference to the attached drawings.

Figure 3:
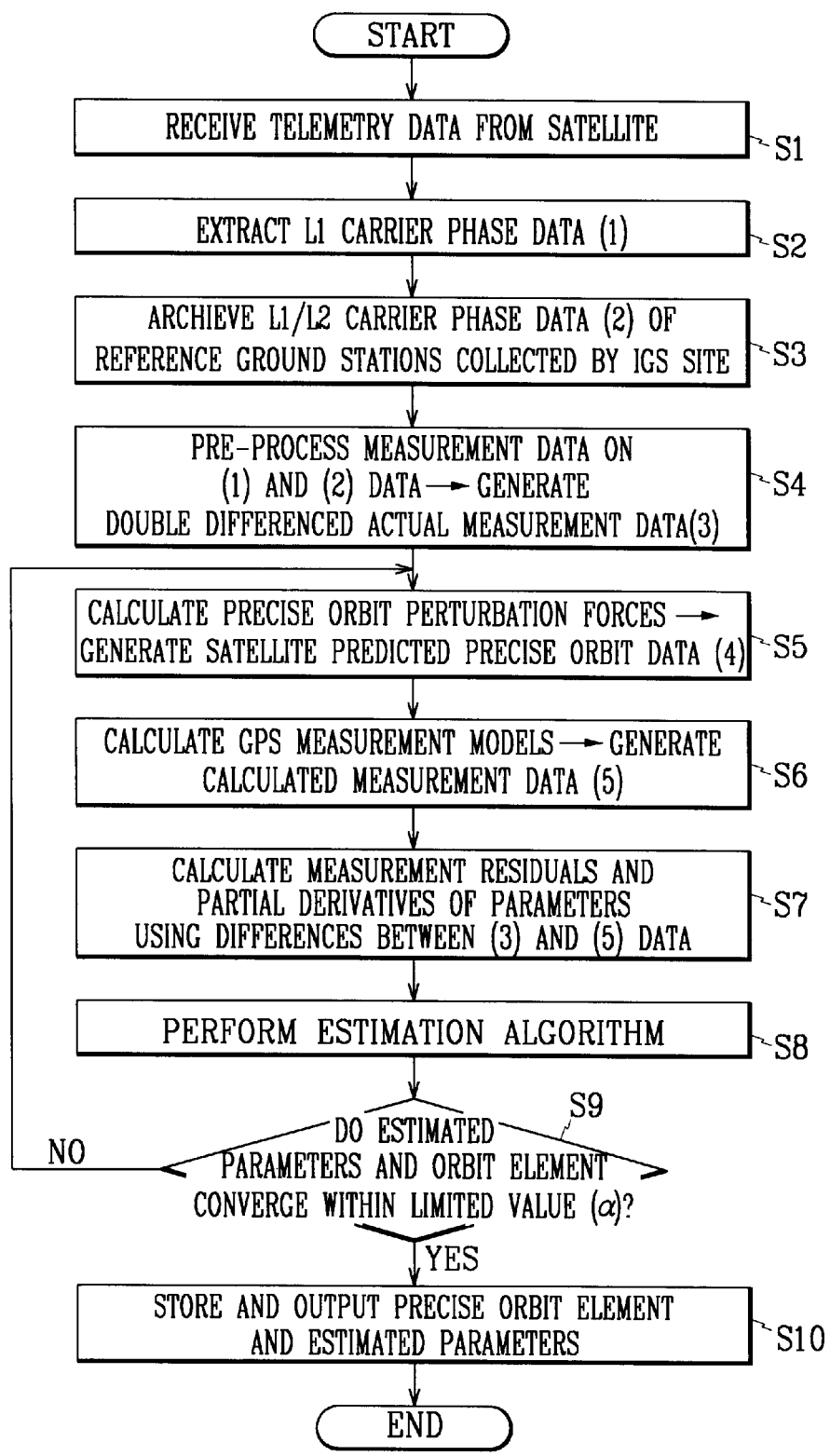
FIG. 3 is a flowchart showing a method for determining a precise orbit of a satellite according to an embodiment of the present invention.

FIG. 3 is a flowchart showing a method for determining a precise orbit of a satellite according to an embodiment of the present invention.

As shown in FIG. 3, the TTC module 510 of the satellite control system 500 transmits the telemetry data received from the low orbit satellite 200 to the satellite operations sub module 520 (S1). The satellite operations sub module 520 extracts the L1 carrier phase data from the telemetry data (S2).

The first data generator 531 of the MAPS 530 receives the L1/L2 carrier phase data of the reference ground stations, which is collected by the IGS site 300 (S3), and generates the double differenced actual measurement data on the L1/L2 carrier phase data and the L1 carrier phase data extracted by the satellite operations sub module 520 by pre-processing processor (S4).

The second data generator 532 calculates the precise orbit perturbation forces from a priori orbit and attitude elements at the measurement time and generates predicted precise orbit data of the satellite with respect to the given measurement time according to the equation of motion for the satellite (S5).

The third data generator 533 generates the measurement errors and the calculated measurement data by the GPS measurement models using the precision orbit data of the satellite predicted as described above (S6). The fourth data generator 534 calculates the measurement residuals and the partial derivatives of the parameters to be determined using the differences between the actual measurement data of the first data generator 531 and the calculated measurement data of the third data generator 533, and generates each data (S7).

The fourth data generator 534 estimates the parameters' values and the orbit element at epoch using the measurement residuals and the partial derivatives of the parameters through the estimation algorithm (S8). The MAPS 530 determines whether the difference between the orbit element estimated through the estimation algorithm and the actual measurement data converges within a limited value (alpha) given by the system (S9). When it is determined that the difference does not converge within the limited value ($\alpha$), the estimated orbit element is used as a priori orbit element at the measurement time and the processes from S5 to S9 are repeatedly performed.

When it is determined that the difference converges within the limited value (alpha), the precision orbit element of the satellite and the estimated parameter value are stored and output (S10).

Figure 4:
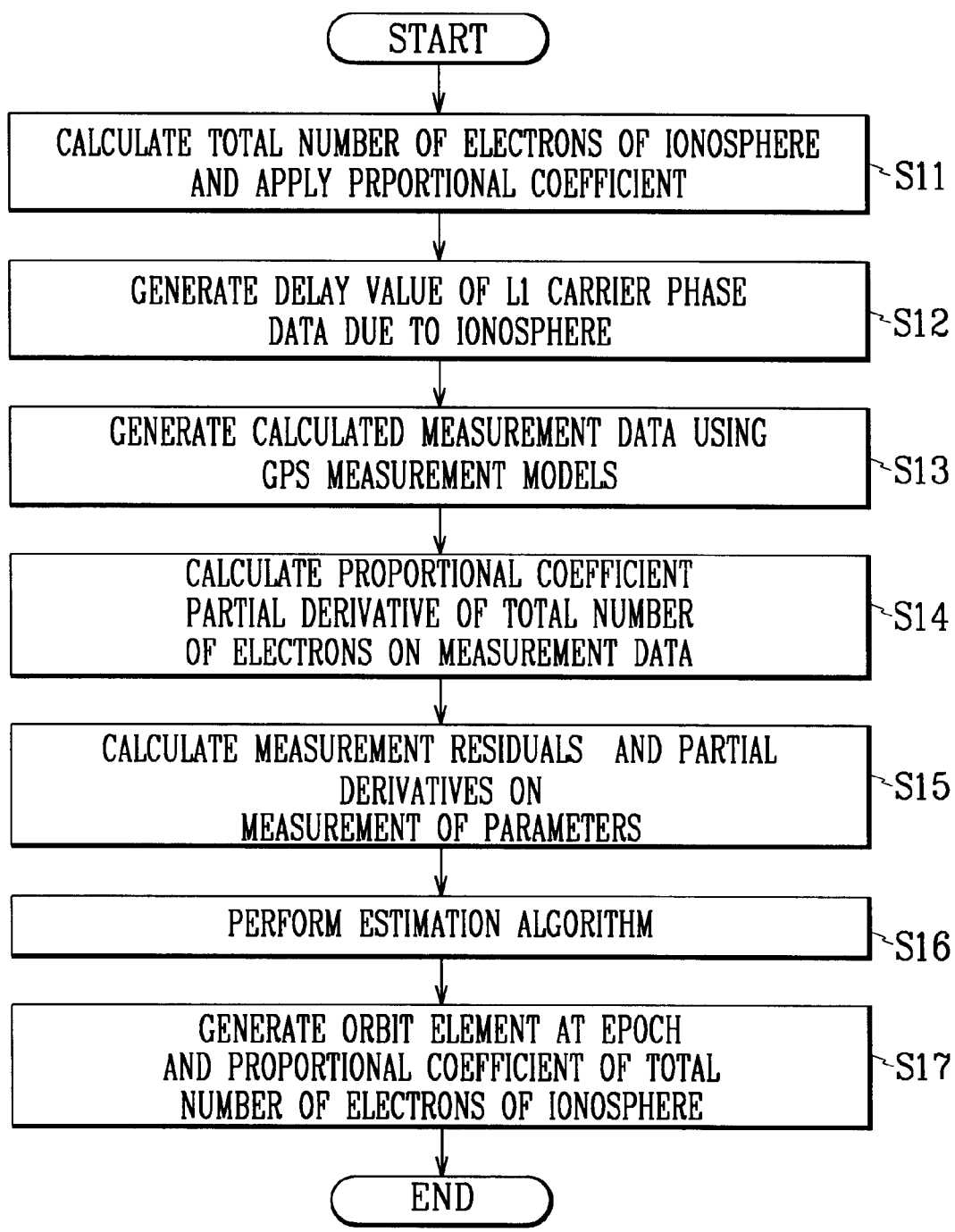
FIG. 4 is a flowchart showing an example of applying a proportional coefficient of the total number of electrons of the ionosphere in the method for determining the precise orbit of the satellite according to the present invention.

The image processing system 600 processes the image data collected by the satellite, generates the image data as a precise photograph image, and outputs the photograph image using the precise orbit element of the satellite. FIG. 4 is a flowchart showing an example of applying a proportional coefficient of the total number of electrons of the ionosphere in the method for determining the precise orbit of the satellite according to the present invention.

As shown in FIG. 4, the MAPS 530 calculates the total number of electrons of the ionosphere through the GPS measurement models using a priori orbit and attitude elements at the measurement time and the proportional coefficient of the total number of electrons and applies the proportional coefficient (S11).

The MAPS 530 calculates the delay value of the L1 carrier phase data due to the ionosphere from the total number of electrons of the ionosphere (S12). Also, the MAPS 530 generates the calculated measurement data using GPS measurement models other than ionospheric path delay effect such as geometric distance, tropospheric path delay error, phase center offset and variation of the GPS receiver antenna, relativistic effect, and tide effect using the delay value of the L1 carrier phase data (S13).

The MAPS 530 calculates the proportional coefficient partial derivative of the total number of electrons on the measurement data using the delay value of the L1 carrier phase data due to the ionosphere (S14) and calculates the measurement residuals and the partial derivatives on the measurement of the parameters to be determined from the calculated measurement data generated in the step S13 and the double differenced actual measurement data (S15).

The MAPS 530 performs the estimation algorithm using the partial derivative of the total number of electrons with respect to the survey, which is calculated in the step S14, and the measurement residuals and the partial derivatives of the parameters, which are calculated in the step S15 (S16), generates the orbit element and the proportional coefficient of the total number of electrons of the ionosphere at epoch, and includes them in the estimated parameters (S17).

In the system and the method according to the embodiment of the present invention, the proportional coefficient of the total number of electrons of the ionosphere is estimated using not the carrier phase data of the L1/L2 double frequency received from on-board the low orbit satellite but only the carrier phase data of a single frequency L1. Accordingly, it is possible to minimize the error of the ionosphere model and to precisely determine the orbit of the satellite.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

In the system for determining the precise orbit of the satellite and the method thereof according to the present invention, it is possible to improve the orbit determination performance of the satellite and to reduce expenses for designing and developing the satellite using not the carrier phase data of the L1/L2 double frequency received from on-board the low orbit satellite but the L1 carrier phase data of the single frequency. Because the amount of data transmitted to the ground is reduced, it is possible to effectively operate the satellite.

In the system for determining the precise orbit of the satellite and the method according to the present invention, it is possible to minimize the error of the ionosphere model by including the proportional coefficient of the total number of electrons of the ionosphere in the estimation parameters, thus removing the path error caused by the ionosphere while using only the L1 carrier phase data of the single frequency.

What is claimed is:

1. A system for determining a precise orbit of a satellite including a satellite for receiving global positioning system (GPS) data from the GPS satellites, an international GPS service for geodynamics (IGS) for collecting and processing L1/L2 carrier phase data of reference ground stations of the GPS satellites distributed all over the world, a satellite control system for monitoring and controlling a state of a satellite by receiving telemetry data and transmitting telecommand data through an antenna, and for achieving the L1/L2 carrier phase data of the IGS, and an image processing system for processing image data collected by the satellite, wherein the satellite control system comprises:
a tracking, telemetry and command (TTC) module for receiving the telemetry data from the satellite, tracking the satellite, and performing a link to the satellite;
a satellite operations sub module for extracting the L1 carrier phase data by processing and analyzing the telemetry data received by the TTC module, monitoring the state of the satellite, generating the telecommand data to be transmitted to the satellite, and controlling and operating the satellite; and
a mission analysis and planning subsystem (MAPS) for determining the precise orbit of the satellite using the L1 carrier phase data extracted by the satellite operations sub module, the L1/L2 carrier phase data of the reference ground stations of the GPS satellites collected by the IGS, and a path error caused by the ionosphere of data, and analyzing and planning a mission of the satellite.

2. The system of claim 1, wherein the MAPS comprises:
a first data generator for generating the double differenced actual measurement data with respect to the L1 carrier phase data extracted by the satellite operations sub module and the L1/L2 carrier phase data of the reference ground stations of the GPS satellites collected by the IGS by pre-processing processor;
a second data generator for generating predicted precise orbit data of a satellite by applying precise orbit dynamics models from a priori orbit and attitude elements at the measurement time with respect to the L1 carrier phase data extracted by the satellite operations sub module and the L1/L2 carrier phase data of the reference ground stations of the GPS satellites collected by the IGS;
a third data generator for calculating measurement errors through a GPS measurement models and generating calculated measurement data with respect to the predicted precision orbit data of the satellite, which is generated by the second data generator; and
a fourth data generator for generating a proportional coefficient of the total number of electrons through an operation between the calculated measurement data of the third data generator and the actual measurement data of the first data generator, estimating parameters and the precision orbit of the satellite, and generating the orbit element and the estimated parameters comprising the proportional coefficient of the total number of electrons of the ionosphere.

3. The system of claim 2, wherein precise orbit dynamics models of the second data generator calculate precise orbit perturbation forces caused by gravitational forces and perturbation forces caused by non-gravitational forces from a priori orbit and attitude elements at the measurement time and generate the predicted precise orbit data of the satellite with respect to the given measurement time according to the equation of motion for a satellite.

4. The system of claim 2, wherein the GPS measurement models of the third data generator calculates measurement models such as ionospheric path delay effect, tropospheric path delay effect, relativistic effect, tide effect of the earth and the ocean, and phase center offset and variation of the GPS receiver antenna.

5. The system of claim 2, wherein the third data generator calculates the total number of electrons of the ionosphere using a priori orbit and attitude elements at the measurement time and the proportional coefficient of the total number of electrons, calculates a delay value of the L1 carrier phase data due to the ionosphere from the total number of electrons of the ionosphere, calculates the proportional coefficient partial derivative of the total number of electrons of the ionosphere using the delay value of the L1 carrier phase data, and calculates measurement errors.

6. The system of claim 2, wherein the fourth data generator generates measurement residuals and the partial derivatives of the parameters using the differences between the calculated measurement data of the third data generator and the actual measurement data of the first data generator, and estimates the parameters and the precise orbit of the satellite.

7. The system of claim 5, wherein the fourth data generator estimates the state of the satellite and the parameters, which affect the orbit of the satellite, by a package process filter of a weighted least squares batch filter using the measurement residuals and the partial derivatives of the parameters.

8. A method for determining a precise orbit of a satellite including a satellite for receiving global positioning system (GPS) data from the GPS satellites, an international GPS service for geodynamics (IGS) for collecting and processing L1/L2 carrier phase data of reference ground stations of the GPS satellites distributed all over the world, a satellite control system for monitoring and controlling a state of a satellite by receiving telemetry data and transmitting telecommand data through an antenna, and for achieving the L1/L2 carrier phase data of the IGS, and an image processing system for processing image data collected by the satellite and generating a precise image photograph, the method comprising:

(a) receiving telemetry data from the satellite and extracting the L1 carrier phase data from the telemetry data; and (b) determining the precise orbit of the satellite using the L1 carrier phase data extracted in the step (a), the L1/L2 carrier phase data collected by the IGS, and a path error caused by the ionosphere and analyzing and planning a mission of a satellite.

9. The method of claim 8, wherein the step (b) comprises the step of processing image data collected by the image processing system from the satellite using the precise orbit data of the satellite and generating a precise image.

10. The method of claim 8, wherein the step (b) comprises:

(b1) generating the double differenced actual measurement data with respect to the L1 carrier phase data and the L1/L2 carrier phase data collected by the IGS by pre-processing processor;

(b2) generating predicted precise orbit data of the satellite with respect to the L1 carrier phase data and the L1/L2 carrier phase data collected by the IGS by applying the precise orbit dynamics models from a priori orbit and attitude elements at the measurement time;

(b3) calculating measurement errors with respect to the predicted precision orbit data of the satellite, which is generated in the step (b2), through the GPS measurement models and generating the calculated measurement data; and (b4) estimating the parameters and the precise orbit of the satellite by performing an operation on the calculated measurement data generated in the step (b3) and the actual measurement data generated in the step (b1), generating the proportional coefficient of the total number of electrons of the ionosphere, and generating the orbit element and the estimation parameters comprising the proportional coefficient of the total number of electrons of the ionosphere.

11. The method of claim 10, wherein the step (b4) comprises:

(i) calculating the measurement residuals and the partial derivatives of the parameters to be determined using the differences between the calculated measurement data and the actual measurement data;

(ii) estimating the parameters and the satellite orbit using the measurement residuals and the partial derivatives of the parameters in the step (i) and determining whether the differences between the estimated satellite orbit and the actual data converges within a limited value given by the system; and (iii) storing and outputting the precision orbit element of the satellite and the estimated parameters when the differences between the satellite orbit estimated in the step (ii) and the actual measurement data converges within the limited value given by the system.

12. The method of claim 10, when the difference between the satellite orbit estimated in the step (ii) and the actual measurement data does not converge within the limited value given by the system, further comprising:

(iv) performing the steps (b2) through (b4) using the estimated satellite orbit element as a priori orbit element at the measurement time and determining whether the difference between the re-estimated satellite orbit and the actual measurement data converges within the limited value given by the system.

13. The method of claim 10, wherein the GPS measurement models in the step (b3) calculate measurement models such as ionospheric path delay effect, tropospheric path delay effect, relativistic effect, tide effect of the earth and the ocean, and phase center offset and variation of the GPS receiver antenna through modeling.

14. The method of claim 10, wherein the step (b3) comprises:

(i) calculating the total number of electrons of the ionosphere using a priori orbit and attitude elements at the measurement time and the proportional coefficient of the total number of electrons and applying the GPS measurement models;

(ii) calculating the delay value of the L1 carrier phase data caused by the ionosphere from the total number of electrons of the ionosphere, which is calculated in the step (i); and (iii) calculating the proportional coefficient partial derivative of the total number of electrons of the ionosphere and the measurement error using the delay value of the L1 carrier phase data, which is calculated in the step (ii), and calculating the calculated measurement data by applying other GPS measurement models other than the ionospheric path delay effect.

15. The method of claim 10, wherein, in the step (b4), the parameters and the orbit element of the satellite are estimated using the proportional coefficient partial derivative data of the total number of electrons of the ionosphere, which is calculated in the step (iii), and the orbit element at epoch, and the proportional coefficient of the total number of electrons of the ionosphere are generated and are applied to determine the precise orbit of the satellite.

* * * * *